J. W. GRAYDON.
Coupling for Pipes of Railroad Car-Heaters.
No. 212,376. Patented Feb. 18, 1879.
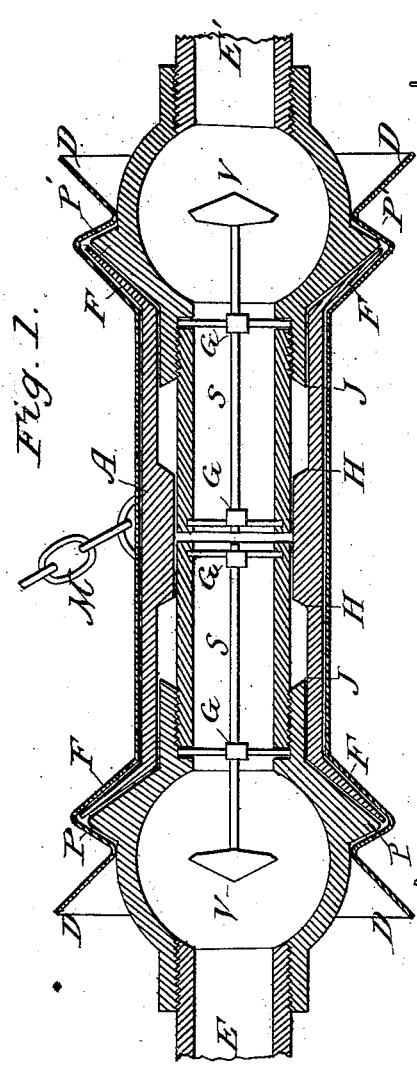
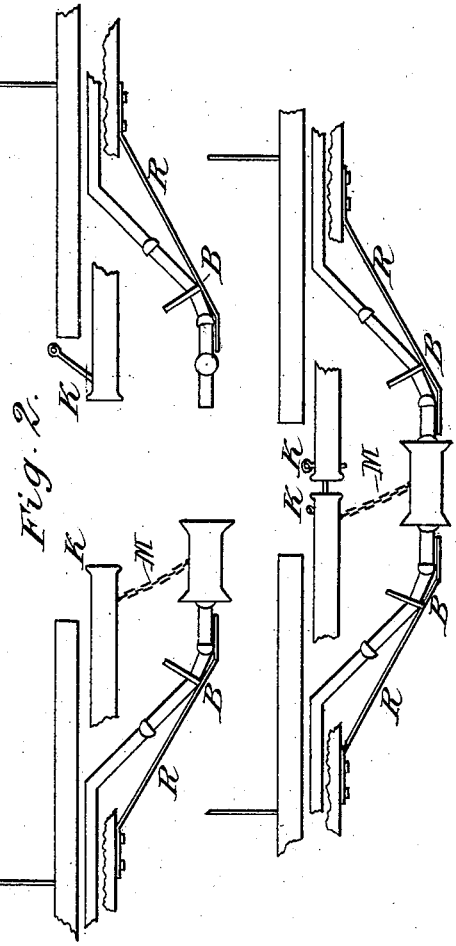
Attest:
Wm Graydon
W W McCullough
Inventor.
James W. Graydon

UNITED STATES PATENT OFFICE.

JAMES W. GRAYDON, OF WASHINGTON, DISTRICT OF COLUMBIA, ASSIGNOR TO THE GRAYDON SAFETY RAILROAD CAR HEATING COMPANY.

IMPROVEMENT IN COUPLINGS FOR PIPES OF RAILROAD-CAR HEATERS.

Specification forming part of Letters Patent No. 212,376, dated February 18, 1879; application filed September 21, 1878.

*To all whom it may concern:*

Be it known that I, JAMES W. GRAYDON, of Washington, District of Columbia, have invented a new and useful Improvement in my Method for Heating Railroad-Cars, which improvement more particularly relates to the coupling of the pipes between the cars, and is an improvement on my Patent No. 203,611, dated May 14, 1878, and application for improvement filed June 27, 1878; and I do hereby declare that the following is a full, clear, and exact description of the same.

My invention is designed to be used in coupling the pipes, and is so arranged that they will couple themselves when the cars come together, and at the same time open the pipes for the passage of steam, and when the cars separate the pipes uncouple and are also closed, preventing the escape of steam.

Figure 1 represents a longitudinal section through the coupling and pipes, showing valves V V; valve-stems S S; guides G G G G for valve-stems to move in; springs D D D D to hold the coupling and pipes together; bell-shaped ends F F of the coupling; beveled edges H H on the coupling and J J on the pipes, by means of which the packings are compressed on the pipes and the whole made steam-tight, as in Patent No. 203,611; ring-projections P P P P on the outside of valves, on which the springs catch when the pipes are pushed into the coupling by the force of the cars coming together; the detachable chain M, which will admit of the coupling being transferred from one end of the car to the other.

Fig. 2 represents the platforms of two approaching cars with the coupling and pipe in position on rests R R, which are secured to each draw-bar K K.

Fig. 3 represents the cars coupled up, and also the pipes.

B B are large rings placed at right angles to the rests R R, and limit the lateral and fore-and-aft motion of the pipes.

The operation is as follows: The pipes on each car being in position on the rests R R, the cars approach each other. The bell-shaped end of the coupling guides the pipe E into its place on the coupling, and the force of the cars coming together forces the pipes in until the springs slip over the projections P P. The beveled edges compress the packings, making the whole steam-tight, as shown by Patent No. 203,611.

The valve-stems being in the center of the pipes E E, their ends meet and open the valves V V for the passage of steam. In uncoupling, when the cars separate, the pipe E is withdrawn from the coupling, and the steam from either car closes the valves; then the coupling and pipe fall into the rests R R.

The springs D D D D are sufficiently strong to withstand the pressure of the steam; but a greater force will slip them over the projections P P, and thus separate the pipe E from the coupling.

What I claim as new, and desire to secure by Letters Patent, is—

1. The coupling A, with the bell-shaped ends F F, springs D D D D, and ring projections P P P P, substantially as described, and for the purpose set forth.

2. The rests R R, secured to the draw-bars, the detachable chain M, and the ring-guides B B, in combination with the pipe-sections, substantially as described, and for the purpose set forth.

JAMES W. GRAYDON.

Witnesses:
M. E. GRAYDON,
W. W. McCULLOUGH.